Patented June 10, 1952

2,599,553

UNITED STATES PATENT OFFICE 2,599,553

COMPLEX ALUMINUM SOAP

Bruce W. Hotten, Richmond, Calif., assignor to California Research Corporation, San Francisco, Calif., a corporation of Delaware No Drawing. Application February 17, 1950, Serial No. 144,850

8 Claims. (Cl. 260—414)

This invention relates to new aluminum mixed organic anion soaps (e. g., aluminum benzoate stearate), i. e., aluminum soaps having anions derived from more than one organic acid, particularly anions derived from organic acids differing substantially in oil solubilities.

It is a primary object of this invention to provide as a new class of compounds aluminum soaps having mixed organo anions.

It is a further object of this invention to provide a class of aluminum soaps having new and unique properties.

These and other objects of this invention will be apparent from the ensuing description and the appended claims.

It has been discovered that certain aluminum mixed organic anion soaps possess valuable and apparently unique properties.

It has long been believed that the organo anions of aluminum soaps should be identical in order to obtain aluminum soaps of sufficient oil solubility to form proper gel structure and to impart characteristic properties to greases, to serve as fillers for inks, to impart desired flatting characteristics to paints, etc. However, it has now been found that the mixed organic anion aluminum soaps of this invention (i. e., the complex aluminum soaps) have numerous advantages over the aluminum soaps having identical organic anions.

The complex aluminum soaps are particularly useful in greases. These soaps impart to the grease composition high melting point and resistance to emulsification in water, as set forth in the United States patent application Serial No. 112,584, filed August 26, 1949, of which application this is a continuation-in-part.

The soaps of this invention are useful as flatting agents for surface-coating materials, as detergents, as emulsifying agents (water-in-oil type emulsions especially), as water proofing and fungistatic agents for fabrics, as concrete curing agents, as hardening agents, as thickening agents in paints and inks, etc.

The present complex aluminum soaps contain at least two dissimilar substantially hydrocarbonaceous organic anions having certain characteristics. The organo anions are generally oleophilic; however, one of the organo anions of the complex soap molecule has a greater oil solubility than the other organo anion of the same soap molecule. For purposes of simplification of the discussion of the characteristics of the organo anions of the complex aluminum soap, the organo anions of greater oil solubility will be designated as "relatively oleophilic" anions, and the organo anions of lesser oil solubility will be designated as "relatively oleophobic" anions.

The organo anions are derived from organic acids, one of which is "relatively oil-soluble" and another of which is "relatively oil-insoluble." That is, the organo acids of the relatively oleophilic anions are relatively oil-soluble, while the organo acids of the relatively oleophobic anions are relatively oil-insoluble, i. e., less oil-soluble as compared to the oleophilic organo acids.

The aluminum di-soaps of the more soluble organo anions (i. e., the relatively oleophilic anions) are soluble in an amount of at least 5% (by volume) at 400° F. in a petroleum white oil having viscosity characteristics of 346 SSU at 100° F. and 54 SSU at 210° F. and having a viscosity index of 92. That is, at 400° F., 5% of the aluminum soap of the oleophilic organo anion will form a true solution in the petroleum white oil. On the other hand, the aluminum soaps of the less soluble organo anions (i. e., the relatively oleophobic anions) are soluble in the above white oil in an amount of less than 1% at 400° F. That is, at 400° F., less than 1% (from 0% to about 1%) of the aluminum soap containing the oleophobic anions will dissolve in the white oil to form a true solution.

The aluminum di-soaps of each of the organo-anions (i. e., the aluminum di-soaps of the oleophilic anion and the aluminum di-soaps of the oleophobic anion) are insoluble in water. For example, in the aluminum-benzoate-stearate soap, which is an example of a complex aluminum soap of this invention, the aluminum di-soap of the benzoate anion (i. e., aluminum di-benzoate) and the aluminum di-soap of the stearate anion (i. e., aluminum di-stearate) are insoluble in water.

Furthermore, the aluminum soaps of the relatively oleophobic anions melt at a temperature about 400° F., and the aluminum soaps of the relatively oleophilic anions melt at a temperature less than 350° F.

The complex aluminum soaps of this invention are polymeric in structure, that is, the complex aluminum soaps have more than one aluminum atom and at least two dissimilar organo anions throughout the polymeric structure. It is possible for the complex aluminum soaps to contain as many as 1,000 or more monomeric units, each monomeric unit containing one aluminum atom having all of its valences satisfied by at least one hydroxyl group and two organo anions. Thus, it is readily understood that although aluminum has a valence of +3, it is not meant herein to limit the complex aluminum soap of this invention to one containing only three specific anions. In the over-all average, the valence bonds of the aluminum atoms can be directed to more than three specific anions, that is, to more than one hydroxyl anion and more than two organo anions. The average molecule in the soap may contain a plurality of relatively oleophilic anions or a plurality of relatively oleophobic anions per aluminum atom. For example, it may be advantageous in some instances to use a complex aluminum soap as exemplified by aluminum benzoate-stearate-caprylate.

Suitable relatively oleophilic anions are anions of certain aliphatic (saturated and unsaturated), alkaryl, aralkyl, and alkyl-substituted cycloaliphatic carboxylic acids, and organo-substituted acids of sulfur and/or phosphorus. The acids must be sufficiently aliphatic and hydrocarbonaceous in character to impart the defined oil-solubility. Thus, suitable aliphatic carboxylic acids contain from 8 to about 30 carbon atoms, preferably from 12 to 18 carbon atoms. The aliphatic substituent in the various cyclic carboxylic acids should contain from about 4 to about 20 carbon atoms on the aliphatic group attached to the ring. The aralkyl, alkaryl, and cycloaliphatic carboxylic acids preferably contain a total of about 16 carbon atoms. The relatively oleophilic anion can also be derived from substituted phenols; that is, the oleophilic anion may be an alkyl phenol containing at least 4 carbon atoms in the alkyl group, preferably 16 carbons in the alkyl group; e. g., cetyl phenol.

It is preferred that the organo-substituted acids of sulfur and phosphorus contain from about 14 to about 36 carbon atoms in the organo substituent. The oleophilic acid anions may contain various substituents, such as chlorine, hydroxy, amino, alkoxy, e. g., methoxy, and the like radicals, so long as the anion remains substantially hydrocarbonaceous in character.

Examples of the carboxylic acids from which the oleophilic anions are derived are caprylic acid, capric acid, lauric acid, myristic acid, palmitic acid, stearic acid, 12-hydroxy stearic acid, arachidic acid, melissic acid, oleic acid, linoleic acid, butyl benzoic acid, hexyl benzoic acid, octyl benzoic acid, decyl benzoic acid, phenyl butyric acid, phenyl hexanoic acid, phenyl decanoic acid, cetyl benzene sulfonic acid, didodecyl benzene sulfonic acid (a dipolypropylene benzene sulfonic acid), an alkane phosphonic acid having from about 24 to about 36 carbon atoms in the alkane group, cetyl thiophosphoric acid, naphthenic acids, etc.

The relatively oleophobic anions are substantially hydrocarbonaceous in structure and can be selected from anions of certain aliphatic (saturated and unsaturated), aromatic, aralkyl, alkaryl and cycloaliphatic mono- and polycarboxylic acids. Suitable aliphatic monocarboxylic acids contain from 4 to 7 carbon atoms, and dicarboxylic acids contain from 4 to 20 carbon atoms, so long as the aluminum di-soap of the oleophobic anion resulting therefrom has a solubility in white oil of less than 1%. The alkyl groups of the aralkyl and alkaryl carboxylic acids contain no more than 3 carbon atoms. Thus, the alkaryl and the aralkyl carboxylic acids contain a total of not more than 9 carbon atoms.

The oleophobic anions of the complex aluminum soaps can also be anions of organic substituted acids of phosphorus, e. g., phenyl phosphate, an organic substituted acid of boron, e. g., methane boronic acid, or in some cases an anion of an organic substituted acid of silicon, e. g., benzene siliconic acid. For example, the oleophobic anion portion of the average molecule may contain, in part, an organo-phosphate ($-PO_4R$) anion, wherein R is an organic radical.

Suitable oleophobic anions are derived from: benzoic acid, methyl benzoic acid, ethyl benzoic acid, toluic acid, phenyl acetic acid, phenyl propionic acid, oxalic acid, malonic acid, isosuccinic acid, glutaric acid, adipic acid, pimelic acid, suberic acid, azelaic acid, sebacic acid, phthalic acid, salicylic acid, carboxy-methylcellulose, polyacrylic acid, etc.

The ratio of the oleophobic to the oleophilic anions in the soap of this invention can vary depending upon the purpose for which the soap is used. The more oil-soluble organo anions (i. e., the relatively oleophilic group) and the less oil-soluble organo anion (i. e., the relatively oleophobic group) are present in such proportions to each other as to be of utmost effectiveness for the desired use. For example, when the complex soap of this invention is used to modify the properties of grease compositions, that is, to impart high melting point and resistance to emulsibility in water to the grease composition, the ratio of the oleophobic anion to the oleophilic anion (on an average molecule basis) can be altered so that the desired grease structure will be obtained in lubricating oils of varying solvency characteristics. The ratio of oleophobic anions to the oleophilic anions in the average soap molecule may vary from 1:10 to 10:1.

As stated, the number of free hydroxyl groups present in the aluminum soaps of this invention can range from 1 to 2 hydroxyl groups for each aluminum atom in the soap. As the number of free hydroxyl groups present decreases and becomes substituted by organic groups, the complex aluminum soap becomes more acidic, and more easily dispersed in mineral oil type solvents. As the number of free hydroxyl groups increases, the complex aluminum soap becomes more basic, and more easily dispersed in polar type solvents, e. g., glycols, carbitols, etc.

It is known that the third "OH" group of $Al(OH)_3$ is most difficultly displaced or neutralized; in fact, the third "OH" group is not displaced by fatty acids. However, the small basic effect of the remaining "OH" group may be neutralized in effect by the attachment of a fatty acid to the soap molecule. When an aluminum "tri-soap" (e. g., aluminum "tri-stearate") is formed, the third "OH" group is still present. The third acid molecule attaches to the aluminum soap molecule by means of a hydrogen bonding effect, apparently neutralizing the small basic effect of the remaining "OH" group. Per aluminum atom, up to 1 mol of acid may be loosely bound to the soap molecule.

Examples of complex aluminum soaps of this invention are: aluminum benzoate stearate, aluminum benzoate di-stearate, aluminum benzoate oleate, aluminum benzoate 12-hydroxy stearate, aluminum toluate stearate, aluminum benzoate naphthenate, aluminum benzoate hydrogenated rosin, aluminum benzoate sulfonate, aluminum azelate stearate, aluminum alizarinate stearate, aluminum phosphate benzoate stearate, aluminum benzoatehydroxy stearate, etc.

The complex aluminum soaps of this invention can be prepared according to methods involving co-precipitation. For example, aqueous solutions of mixtures of the water-soluble soaps (e. g., sodium soaps) in the desired proportion of relatively oleophilic and relatively oleophobic anions are admixed with an aqueous solution of an aluminum salt (e. g., aluminum sulfate). The resulting precipitate of the complex aluminum soap is then preferably purified to remove the salts such as sodium sulfate.

When the complex aluminum soap has been precipitated from its reaction medium (e. g., water), it is desirable that this complex aluminum soap precipitate be removed from the reaction medium as soon as possible.

Complex aluminum soaps may also be prepared in situ according to the method described in Jones Patent No. 2,469,041, wherein it is taught that a fatty acid (e. g., stearic acid) can be added to a mineral oil solution of an aluminum alcoholate (e. g., aluminum butoxide) to form an aluminum stearate, except that in the preparation of the complex aluminum soaps a mixture of fatty acids is used.

In the formation of the complex aluminum soaps of this invention, it is desirable that less than one equivalent of the aluminum inorganic compound react with a total of about one equivalent of the saponifiable organic material (e. g., the organic acids) noted hereinabove.

The following examples illustrate the preparation of the complex aluminum soaps of this invention.

*Example 1.—The preparation of aluminum azelate stearate*

A mixture of 13.5 parts by weight of commercial stearic acid (approximately 60% stearic acid and the remainder mainly palmitic acid) and 10 parts by weight of azelaic acid was dissolved in 400 parts by weight of water at approximately 180° F. This solution was slowly added, with stirring, to a solution of 24.9 parts by weight of aluminum sulfate octadecahydrate in 300 parts by weight of water at this same temperature. The resulting reaction mixture was filtered. The white precipitate which was formed during the reaction was washed with water by adding the white precipitate to a large amount of water and then stirring vigorously. The precipitate was washed in this manner three separate times until only a faint positive sulfate ion test was attained in the filtrate from the third wash. The resulting mixed soap was then dried at a temperature ranging from 210° F. to 250° F., was powdered and passed through a No. 60 mesh sieve.

*Example 2.—Preparation of aluminum toluate stearate*

A mixture of 28.6 parts by weight of toluic acid containing a 2:1 mixture of the meta and para isomers, 27 parts by weight of commercial stearic acid, and 18 parts by weight of sodium hydroxide was dissolved in 400 parts by weight of water at about 180° F. This solution was slowly added, with stirring, to 50 parts by weight of aluminum sulfate octadeca-hydrate in 300 parts by weight of water at the same temperature. The resulting complex polyvalent metal soap was filtered, washed and dried as described in Example 1. On ashing, the soap left 13.9% $Al_2O_3$ (theoretical for the aluminum toluate stearate is 13.6%).

*Example 3.—Preparation of aluminum benzoate stearate (benzoate/stearate ratio=1.0)*

A mixture of 12.2 parts by weight of benzoic acid, 27.1 parts by weight of commercial stearic acid and 16.8 parts by weight of potassium hydroxide was dissolved in about 500 parts by weight of water at 150° F., forming a clear solution. To this solution was added 33.3 parts by weight of aluminum sulfate octadecahydrate dissolved in about 300 parts by weight of water. The resulting aluminum benzoate stearate was obtained by filtering, washing and drying the precipitate as above in Example 1. On ashing, the soap left 11.6% $Al_2O_3$ (theoretical for $AlC_{24}H_{39}O_5$=11.4%).

*Example 4.—Preparation of aluminum benzoate stearate (benzoate/stearate ratio=0.1)*

A mixture of 1.22 parts by weight of benzoic acid, 27 parts by weight of commercial stearic acid and 9.24 parts by weight of potassium hydroxide was dissolved in 600 parts by weight of water at 125° F. To this solution was added 22 parts by weight of aluminum nitrate nonohydrate dissolved in 400 parts by weight of water. The resulting aluminum benzoate stearate was obtained by filtering, washing and drying the precipitate as above in Example 1. On ashing, the soap left 10.1% $Al_2O_3$ (theoretical=9.4).

*Example 5.—Preparation of aluminum benzoate stearate (benzoate/stearate ratio=10)*

A mixture of 12.2 parts by weight of benzoic acid, 2.7 parts by weight of commercial stearic acid and 9.24 parts by weight of potassium hydroxide was dissolved in about 600 parts by weight of water at about 125° F. To this solution was added 22 parts by weight of aluminum nitrate nonohydrate in 400 parts by weight of water. The resulting aluminum benzoate stearate was obtained by filtering, washing and drying the precipitate as above in Example 1. On ashing, the soap left 15.5% $Al_2O_3$ (theoretical=16.2).

*Example 6.—Preparation of aluminum benzoate 12-hydroxy stearate*

A mixture of 28.8 parts by weight of sodium benzoate, 48 parts by weight of 12-hydroxystearic acid and 13.6 parts by weight of sodium hydroxide was dissolved in about 500 parts by weight of water at 150° F., forming a clear solution. To this solution was added 68 parts by weight of aluminum nitrate nonohydrate dissolved in about 300 parts by weight of water. The resulting aluminum benzoate hydroxystearate was obtained by filtering, washing and drying the precipitate as shown above in Example 1.

*Example 7.—Preparation of aluminum benzoate naphthenate*

A mixture of 14.4 parts by weight of sodium benzoate, 31 parts by weight of naphthenic acid (molecular weight—280; 90% saponifiables) and 8 parts by weight of sodium hydroxide was dissolved in about 500 parts by weight of water at 150° F., forming a clear solution. To this solution was added 37.5 parts by weight of aluminum nitrate nonohydrate in about 300 parts by weight of water. The resulting aluminum benzoate naphthenate was obtained by filtering, washing and drying the precipitate as shown above in Example 1.

*Example 8.—Preparation of aluminum benzoate alkyl benzene sulfonate*

A mixture of 14.4 parts by weight of sodium benzoate, 74.6 parts by weight of sodium alkyl benzene sulfonate (70% of which was a sodium didodecyl benzene sulfonate and 30% of which was unsulfonated di-dodecyl benzene) and 4.0 parts by weight of sodium hydroxide was dissolved in about 500 parts by weight of water at 150° F., forming a clear solution. To this solution was added 33.3 parts by weight of aluminum nitrate nonohydrate dissolved in about 300 parts by weight of water. The resulting aluminum benzoate alkyl benzene sulfonate was obtained by filtering, washing and drying the precipitate as shown above in Example 1. The resulting soap contained some oil in the form of unsulfonated alkyl benzenes, which caused the soap to be somewhat gummy. Because of this gumminess, it was necessary, when dispersing the soap in oil to form a grease, to use petroleum ether in assisting the dispersion. The petroleum ether was boiled off during the preparation of the grease.

*Example 9.—Preparation of aluminum benzoate phosphate stearate*

A mixture of 8.2 parts by weight of benzoic acid, 18.0 parts by weight of commercial stearic acid, 8.4 parts by weight of tri-sodium phosphate, and 13 parts by weight of potassium hydroxide was dissolved in about 500 parts by weight of water at 150° F., forming a clear solution. To this solution was added 40 parts by weight of aluminum nitrate nonohydrate dissolved in about 300 parts by weight of water. The resulting aluminum benzoate phosphate stearate was obtained by filtering, washing and drying the precipitate as above in Example 1.

*Example 10.—Preparation of aluminum alizarinate stearate*

A mixture of 12 parts by weight of alizarin, 26.7 parts by weight of commercial stearic acid and 16.8 parts by weight of potassium hydroxide were added to about 200 parts by weight of water and heated to 180° F. To this solution was added 40 parts by weight of aluminum nitrate nonohydrate dissolved in 100 parts by weight of water. The resulting aluminum alizarinate stearate (a deep-brown-red precipitate) was obtained by filtering, washing and drying the precipitate as above in Example 1.

X-ray diffraction patterns of the complex aluminum soaps of this invention were obtained to establish the identity of these soaps as true compounds. The following Table I represents the inter-atomic distances, as determined by the X-ray diffraction patterns, of aluminum dibenzoate [OHAl (benzoate)$_2$], aluminum distearate [OHAl (stearate)$_2$] and a member of the new class of compounds, aluminum benzoate stearate [OHAl (benzoate) (stearate)].

TABLE I

| Compound | Aluminum Dibenzoate | | Aluminum Distearate | | Aluminum Benzoate Stearate | |
|---|---|---|---|---|---|---|
| | D | I | D | I | D | I |
| Interatomic Distances in Angstrom Units (D) and Relative Line Intensities (I). | 10.7<br>5.4<br>3.22 | 8<br>1<br>0 | 13.8<br>7.7<br>3.83 | 6<br>3<br>4 | 4.9<br>2.94<br>2.06<br>1.26 | 3<br>2<br>1+<br>0 |

As noted hereinabove, the complex aluminum soaps of this invention are useful for numerous purposes. The use of the complex aluminum soaps to raise the melting point of a grease composition and to increase the resistance of the grease to water emulsibility is set forth in the aforementioned Hotten-Echols U. S. patent application Serial No. 112,548, wherein it was shown that when a mixture of 12 parts by weight of a complex aluminum soap (e. g., aluminum benzoate stearate) was heated together at 450° F. with 108 parts by weight of a California solvent-refined paraffinic base oil having a viscosity of 485 SSU at 100° F., a grease was obtained which was light brown, translucent, and which had an ASTM dropping point of 400+° F. A five-gram sample of the grease remained fully intact without any disintegration when immersed in boiling water for one hour.

The surface activity of the complex aluminum soaps of this invention is adequately illustrated by the following simple emulsification test wherein solutions containing 1% of each of the soaps to be tested in Pearl oil [1] where shaken uniformly with equal volumes of water in 10 ml. graduated cylinders. The cylinders were allowed to stand for one hour, after which time the volume of the separated lower layer was measured. The following Table II presents results obtained in this emulsification test.

TABLE II

| No. | Soap | Toluate-Sulfonate Ratio | Volume of Lower Layer Separated |
|---|---|---|---|
| | | | ml. |
| 1 | None | | 5 |
| 2 | Al Toluate Alkyl Benzene Sulfonate.[2] | 0 | 2 |
| 3 | Al Toluate Alkyl Benzene Sulfonate.[2] | 0.5 | 0 |
| 4 | Al Toluate Alkyl Benzene Sulfonate.[2] | 1 | 3 |
| 5 | Al Toluate Alkyl Benzene Sulfonate.[2] | 2 | 4 |

The data set forth in above Table II illustrates the remarkable effectiveness of the complex aluminum soaps, e. g., aluminum toluate sulfonate, particularly wherein the toluate-sulfonate ratio is 1:2, as an emulsifying agent in a water-oil system.

*Example 11.—Preparation of aluminum toluate alkyl benzene sulfonate (toluate/sulfonate ratio=1.0)*

A mixture of 7 parts by weight of toluic acid, 55 parts by weight of sodium alkyl benzene sulfonate (43% of which was a sodium didodecyl benzene sulfonate and 57% of which was unsulfonated didodecyl benzene) and 5.6 parts by weight of potassium hydroxide was dissolved in about 200 parts by weight of water and 200 parts by weight of 95% ethyl alcohol at 150° F., forming a clear solution. To this solution was added 19 parts by weight of aluminum nitrate nonohydrate dissolved in about 100 parts by weight of water. The resulting aluminum toluate didodecyl benzene sulfonate was obtained by filtering, washing and drying the precipitate as shown above in Example 1.

The complex aluminum soaps are useful as flatting agents in paints and varnishes. Heretofore, aluminum stearate has been one of the most effective flatting agents for paints and varnishes; however, its low gelling temperature has made it necessary to incorporate the aluminum stearate into the vehicle by slow grinding. With the use of a complex aluminum soap, the soap may be incorporated into the vehicle by the more

---

[1] Pearl oil is a kerosene fraction having an initial ASTM (D–86) distillation point of about 348° F., a 50% distillation point of 415° F. and an end point of 512° F.

[2] The aluminum toluate alkyl benzene sulfonate of Example 11 below is an example of the aluminum toluate alkyl benzene sulfonate used in these tests.

desirable fast mill grinding and obtain a flatting effect for paints and varnishes equivalent to or better than the formerly used aluminum di-stearate. The following Table III presents data to show the effect of complex aluminum soaps as flatting agents in paints and varnishes. Metal strips were coated with 1% suspensions of the soaps in black enamel, and the gloss resulting therefrom tested in a gloss meter according to Procedure A of the ASTM specification D523-44T. In the gloss meter, a photoelectric cell registered the amount of light reflected from the paint surface.

TABLE III

| Flatting Agent | Glossiness |
| --- | --- |
| None | 100 |
| Aluminum di-stearate | 44 |
| Aluminum benzoate stearate [1] | 23 |
| Aluminum benzoate stearate [2] | 22 |

[1] The benzoate stearate ratio was 1:2.
[2] The benzoate stearate ratio was 1.

I claim:

1. An aluminum soap having at least two unlike organo anions, one organo anion derived from an organic acid the aluminum di-soap of which acid is characterized by a white oil solubility of at least 5% at 400° F., and another organo anion derived from an organic acid the aluminum di-soap of which acid is characterized by a white oil solubility of less than 1% at 400° F.

2. An aluminum soap having at least two unlike organo anions, one organo anion derived from a carboxylic acid the aluminum di-soap of which acid is characterized by a white oil solubility of at least 5% at 400° F., and another organo anion derived from a carboxylic acid the aluminum di-soap of which acid is characterized by a white oil solubility of less than 1% at 400° F.

3. An aluminum soap having at least two unlike organo anions, one organo anion derived from a fatty acid the aluminum di-soap of which acid is characterized by a white oil solubility of at least 5% at 400° F., and another organo anion derived from an organic acid the aluminum di-soap of which acid is characterized by a white oil solubility of less than 1% at 400° F.

4. An aluminum soap having at least two unlike organo anions, one organo anion being an anion selected from the group of aromatic carboxylic acid anions containing from 1 to 3 non-aromatic carbon atoms, and another organo anion being selected from the group of aliphatic acid anions containing from 8 to 30 carbon atoms.

5. The aluminum soap of claim 4, wherein the aromatic carboxylic acid anion is derived from benzoic acid, and wherein the aliphatic acid anion is derived from stearic acid.

6. The compound, aluminum benzoate stearate.

7. The compound, aluminum toluate stearate.

8. The compound, aluminum toluate didodecyl benzene sulfonate.

BRUCE W. HOTTEN.

REFERENCES CITED

The following references are of record in the file of this patent:

UNITED STATES PATENTS

| Number | Name | Date |
| --- | --- | --- |
| 2,345,061 | Miles | Mar. 28, 1944 |
| 2,417,071 | Gebhart et al. | Mar. 11, 1947 |
| 2,447,064 | Gebhart et al. | Aug. 17, 1948 |
| 2,456,824 | Fischer | Dec. 21, 1948 |